(12) United States Patent
Shibata et al.

(10) Patent No.: US 8,248,685 B2
(45) Date of Patent: Aug. 21, 2012

(54) DISPLAY PARTICLES FOR IMAGE DISPLAY APPARATUS AND IMAGE DISPLAY APPARATUS LOADED WITH THE SAME

(75) Inventors: Kouji Shibata, Tokyo (JP); Okushi Okuyama, Tokyo (JP); Yukio Hosoya, Tokyo (JP); Satoshi Uchino, Tokyo (JP); Hiroyuki Konno, Tokyo (JP); Mikio Kouyama, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 3 days.

(21) Appl. No.: 12/814,556

(22) Filed: Jun. 14, 2010

(65) Prior Publication Data

US 2010/0321762 A1    Dec. 23, 2010

(30) Foreign Application Priority Data

Jun. 18, 2009   (JP) ................. 2009-145421

(51) Int. Cl.
 *G02B 26/00*   (2006.01)

(52) U.S. Cl. ...................................... 359/296

(58) Field of Classification Search .............. 359/296
See application file for complete search history.

(56) References Cited

U.S. PATENT DOCUMENTS

2009/0251764 A1* 10/2009 Uchino et al. ............... 359/296
2010/0208330 A1*  8/2010 Uchino et al. ............... 359/296

FOREIGN PATENT DOCUMENTS

| JP | 2003167277 | 6/2003 |
| JP | 2004029699 | 1/2004 |
| JP | 2006072345 | 3/2006 |

* cited by examiner

*Primary Examiner* — James Jones
(74) *Attorney, Agent, or Firm* — Lucas & Mercanti, LLP (57) ABSTRACT

Display particles having metal oxide layers formed on the surfaces of base particles containing at least a resin and a colorant, wherein the metal oxide layers comprise a polycondensation product formed by using a compound A represented by the following formula (A) and a compound B indicated by the following formula (B) as materials, and an image display apparatus loaded with the display particles:

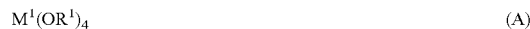

$$M^1(OR^1)_4 \quad (A)$$

(wherein $M^1$ represents a silicon atom or a titanium atom; and $R^1$ represent an alkyl group having 1 to 4 carbon atoms respectively independently):

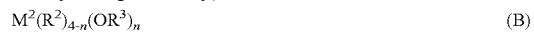

$$M^2(R^2)_{4-n}(OR^3)_n \quad (B)$$

(wherein $M^2$ represents a silicon atom or a titanium atom; $R^2$ represent an alkyl group having 1 to 4 carbon atoms, a phenyl group, an acryloyloxy group, a methacryloyloxy group or an epoxy group, independently; $R^3$ represent an alkyl group having 1 to 4 carbon atoms independently; and n represents an integer of 2 or 3).

18 Claims, 6 Drawing Sheets

(a) Visually recognizable direction

(b) Visually recognizable direction

(a) Before voltage application (Switch OFF)

(b) After voltage application (Switch ON)

Fig. 5

◎ Image display surface
(Base member 11 viewed in visually recognizable direction)

Square cell lattice-shaped configuration

Square cell honeycomb configuration 1

Round cell lattice-shaped configuraion

Line-shaped cell

Hexagonal cell honeycomb configuration

Triangular cell lattice-shaped configuration

Round cell honeycomb configuration

Triangular cell honeycomb configuration

Square cell network configuration

Square cell honeycomb configuration 2

Fig. 6

DISPLAY PARTICLES FOR IMAGE DISPLAY APPARATUS AND IMAGE DISPLAY APPARATUS LOADED WITH THE SAME

This application is based on application No. 2009-145421 filed in Japan, the contents of which are hereby incorporated by reference.

BACKGROUND OF THE INVENTION

1. Field of the Invention

The present invention relates to an image display apparatus that can repeatedly execute displaying and erasing operations of images by allowing display particles to move in an electric field and such display particles used for the display apparatus.

2. Description of the Related Art

Conventionally, an image display apparatus that displays images by moving display particles in a gaseous phase has been known. The image display apparatus has a structure in which display particles in a powder state are sealed between two substrates at least one of which is transparent, and by generating an electric field between the substrates, the display particles are moved and adhered to one of the substrates so that an image is displayed. Upon driving such an image display apparatus, a voltage is applied between the substrates to generate an electric field, and the display particles are moved along the electric field direction so that by selecting the electric field direction on demand, the displaying and erasing operations of images can be executed repeatedly. For this reason, in the image display apparatus, there have been strong demands for reducing adhesive force of the display particles to the display particle contact surfaces between the substrates.

As the display particles for use in an image display apparatus, particles obtained by coating a surface of each of base particles containing a binder resin and a colorant with inorganic fine particles such as hydrophobic silica and hydrophobic titania by a dry mixing method using a Henschel mixer or the like, have been known (Japanese Patent Application Laid-Open No. 2004-29699). However, since such a dry mixing method fails to completely coat the surface of each of base particles, it is not possible to allow the fine particles to sufficiently exert an adhesive force reducing effect. Consequently, upon carrying out repetitive driving operations, degradation of contrast occurs between an image portion and a non-image portion.

Therefore, a technique has been proposed in which, after an inorganic layer has been formed on the surface of each of base particles by using a wet synthesizing method, a surface treatment is carried out thereon so that contrast durability can be improved (Japanese Patent Application Laid-Open Nos 2003-167277 and 2006-72345). As the material for forming such an inorganic layer in the wet synthesizing method, metal tetraalkoxides such as tetraethoxysilane, tetramethoxysilane, tetraethoxy titanium and tetramethoxy titanium, are used.

However, in an attempt to further improve the contrast durability, it is not possible to sufficiently prevent degradation of contrast upon carrying out repetitive driving operations, even by the use of such display particles. For example, after repetitive driving operations of 30,000 times, cracks occur in the inorganic layer to cause a film separation. This causes the surface of the base particle to be exposed, resulting in degradation of contrast.

It is an object of the present invention to provide display particles and an image display apparatus that can sufficiently prevent degradation of contrast at the time of repetitive driving operations for a long period of time.

BRIEF SUMMARY OF THE INVENTION

The present invention relates to display particles for an image display apparatus provided with two substrates at least one of which is transparent, with the display particles being sealed between the substrates in a powder state, so that by generating an electric field between the substrates, the display particles are moved to display an image, wherein the display particles have metal oxide layers formed on the surfaces of base particles containing at least a resin and a colorant, and the metal oxide layers comprise a polycondensation product formed by using a compound A represented by the following formula (A) and a compound B indicated by the following formula (B) as materials, and an image display apparatus provided with the display particles:

$$M^1(OR^1)_4 \quad (A)$$

(wherein $M^1$ represents a silicon atom or a titanium atom; and $R^1$ represent an alkyl group having 1 to 4 carbon atoms respectively independently):

$$M^2(R^2)_{4-n}(OR^3)_n \quad (B)$$

(wherein $M^2$ represents a silicon atom or a titanium atom; $R^2$ represent an alkyl group having 1 to 4 carbon atoms, a phenyl group, an acryloyloxy group, a methacryloyloxy group or an epoxy group, respectively independently; $R^3$ represent an alkyl group having 1 to 4 carbon atoms respectively independently; and n represents an integer of 2 or 3).

DETAILED DESCRIPTION OF THE INVENTION

Display Particles for Image Display Apparatus

Figure 1:
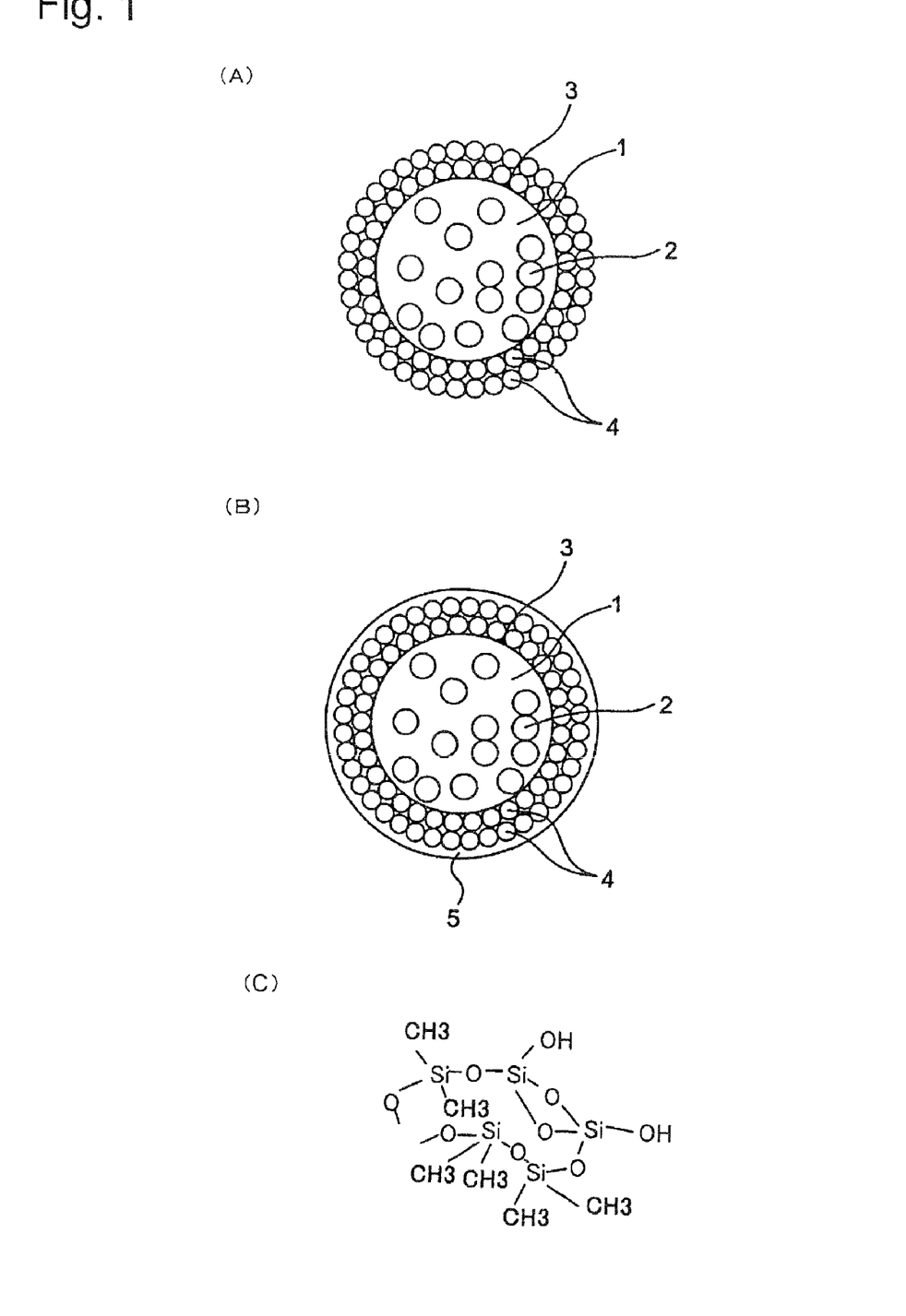
FIGS. 1(A) and 1(B) are schematic cross-sectional views that each illustrate one example of a specific structure of display particles of the present invention.
FIG. 1(C) is a schematic drawing that shows a chemical structure of a metal oxide layer of one embodiment of the present invention.

Each of display particles for an image display apparatus (hereinafter, simply referred to as display particles) of the present invention has a structure in which a metal oxide layer is formed on the surface of each of base particles containing at least a resin and a colorant, and an organic layer may be further formed on the surface of the metal oxide layer. More specifically, for example, as shown in FIG. 1(A), the display particle may have a structure in which a metal oxide layer 4 is formed on the surface of each base particle 3, or as shown in FIG. 1(B), may have a structure in which a metal oxide layer 4 and an organic layer 5 are successively formed on the surface of each base particle 3. FIGS. 1(A) and 1(B) are schematic cross-sectional views that show cross-sectional structures of embodiments of the display particles, and reference numeral 1 represents a resin and 2 represents a colorant.

The metal oxide layer 4 is formed from metal oxide fine particles, and comprises a polycondensation product of predetermined compounds. More specifically, the polycondensation product constituting the metal oxide layer 4 corresponds to a polycondensation product containing at least a compound A and a compound B.

The compound A is metal tetraalkoxide represented by a general formula (A):

$$M^1(OR^1)_4 \qquad (A)$$

In the formula (A), $M^1$ represents a silicon atom or a titanium atom. Preferably, $M^1$ is a silicon atom.

Four $R^1$ groups are present in one molecule, and each $R^1$ independently represents an alkyl group having 1 to 4 carbon atoms. Preferably, each $R^1$ independently represents an alkyl group having 1 to 2 carbon atoms. Specific examples of $R^1$ include a methyl group, an ethyl group, an n-propyl group, an iso-propyl group, an n-butyl group, an iso-butyl group, a sec-butyl group and a t-butyl group.

Specific examples of the compound A include: tetraethoxysilane, tetramethoxysilane, tetraisopropoxysilane, tetraethoxy titanium and tetramethoxy titanium.

The compound B is metal di- or tri-alkoxide represented by a general formula (B):

$$M^2(R^2)_{4-n}(OR^3)_n \qquad (B)$$

In the formula (B), $M^2$ represents a silicon atom or a titanium atom. Preferably, $M^2$ is a silicon atom.

One or two $R^2$ groups are present in one molecule, and each $R^2$ independently represents an alkyl group having 1 to 4 carbon atoms, a phenyl group, an acryloyloxy group, a methacryloyloxy group or an epoxy group. Preferably, each $R^2$ independently represents an alkyl group having 1 to 2 carbon atoms, a phenyl group, an acryloyloxy group or a methacryloyloxy group Specific examples of the alkyl group serving as $R^2$ include a methyl group, an ethyl group, an n-propyl group, an iso-propyl group, an n-butyl group, an iso-butyl group, a sec-butyl group and a t-butyl group.

Two or three $R^3$ groups are present in one molecule, and each $R^3$ independently represents an alkyl group having 1 to 4 carbon atoms. Preferably, each $R^3$ independently represents an alkyl group having 1 to 2 carbon atoms. Specific examples of $R^3$ include a methyl group, an ethyl group, an n-propyl group, an iso-propyl group, an n-butyl group, an iso-butyl group, a sec-butyl group and a t-butyl group.

In this case, n represents 2 or 3. Preferably, n is 2.

Specific examples of the compound B include: methyltriethoxysilane, methylphenyldiethoxysilane, methyl-3-methacryloxypropyldiethoxysilane, dimethyldiethoxysilane, methyltriethoxy titanium, and dimethyldimethoxy titanium.

In the present invention, the metal oxide layer 4 is formed by using the compound B having two to three reaction points in one molecule together with the compound A having four reaction points in one molecule so that it is possible to improve the flexibility of the metal oxide layer, and consequently to prevent cracks and film separations in the metal oxide layer for a long period of time. Normally, the metal oxide layer is formed by allowing the metal atoms to be bonded to one another with an oxygen atom interposed therebetween. In a case where the compound A is solely used for forming the metal oxide layer, all the metal atoms devote themselves to form four "metal atom-oxygen atom-metal atom" bonds per one metal atom. For this reason, the rigidity of the metal oxide layer becomes extremely high, making the layer fragile. In contrast, in a case where the compound B is used together with the compound A as shown in the present invention, since the compound B has $R^2$ groups, and the $R^2$ groups do not devote to the formation of the "metal atom-oxygen atom-metal atom" bonds, the metal atoms ($M^2$) of the compound B only devote to form 2 to 3 "metal atom-oxygen atom-metal atom" bonds. As a result, since the $R^2$ groups of the compound B are left as residual groups, it is considered that the rigidity is prevented from excessively increasing, that the flexibility of the metal oxide layer is improved and that cracks and film separations in the metal oxide layer can be prevented for a long period of time. For example, FIG. 1(C) shows a schematic drawing that indicates a chemical structure of one embodiment of a metal oxide, when tetraethoxysilane is used as the compound A and dimethyldiethoxysilane is used as the compound B.

From the viewpoint of further improving the contrast durability, desirable combinations of the compound A and the compound B are those combinations in which the metal atom $M^1$ of the compound A and the metal atom $M^2$ of the compound B are the same, and, in particular, those combinations of the compound A and the compound B in which both of $M^1$ and $M^2$ are silicon atoms are more preferable.

Specific examples of preferable combinations between the compound A and the compound B are shown below:
(1) Tetraethoxysilane/Dimethyldiethoxysilane;
(2) Tetraethoxysilane/Methyltriethoxysilane;
(3) Tetraethoxysilane/Methylphenyldiethoxysilane;
(4) Tetraethoxysilane/Methyl-3-methacryloxypropyldiethoxysilane.

Among the specific examples of the combinations, the most preferable combinations are (1) and (2).

The chemical composition ratio between the compound A and the compound B in the metal oxide layer 4 is not particularly limited as long as the object of the present invention is achieved. For example, in a case where the compound B is metal dialkoxide of n=2, the composition ratio (A/B) between the compound A and the compound B is preferably 15/85 to 85/15 and more preferably 40/60 to 60/40 in weight ratio. Moreover, in a case where the compound B is metal trialkoxide of n=3, the composition ratio (A/B) between the compound A and the compound B is preferably 15/85 to 85/15 and more preferably 30/70 to 70/30 in weight ratio.

The composition ratio between the compound A and the compound B can be controlled by adjusting the ratio of materials.

The polycondensation product of the metal oxide layer 4 may contain another compound C in addition to the compound A and the compound B. The compound C is a metal monoalkoxide represented by a general formula (C):

$$M^3(R^4)_3(OR^5) \qquad (C)$$

In the formula (C), $M^3$ represents a silicon atom or titanium atom.

$R^4$ is the same as $R^2$ in the general formula (B).
$R^5$ is the same as $R^3$ in the general formula (B).

Specific examples of compound C include trimethylmethoxysilane, trimethylethoxysilane and the like.

Although not particularly limited, the thickness of the metal oxide layer 4 is normally 5 to 250 nm, and more preferably 10 to 100 nm.

The thickness of the metal oxide layer is measured by using a scanning-type probe microscope SPI3800N with a multifunctional unit SPA400 (made by SII-Nano-Technology Inc.).

Upon preparing a measuring sample, base particles, each having the metal oxide layer formed thereon, were enclosed with an epoxy resin, and after having been hardened at 60° C. for 24 hours, this was cut into blocks with planes by using a microtome with diamond teeth so that the block with a smoothed cross section that made it possible to observe the particle cross section was used.

The measurements were carried out by using an FS-100N (in-plane: 100 μm, vertical: 15 μm) as a scanner and an SN-AF01 made of silicon nitride (spring constant: 0.08 N/m) as a micro-cantilever, under a micro-visco-elasticity mode (VE-AFM) as its measuring mode. A shaking frequency was 3 to 5 kHz, and a shaking amplitude was 4 to 6 nm so that four screens indicating the shape image, amplitude A, A sin δ and A cos δ were measured simultaneously with each measuring area of 10 μm×10 μm, and while the metal oxide layer was confirmed through visual observations of the amplitude image, distances between the outermost surfaces of particles to the base particles were measured, and the average value was calculated as the film thickness of the metal oxide layer. More specifically, the calculations were carried out based upon crossing points with straight lines passing through the center of gravity of the particle, with the straight lines being set to 8 straight lines placed radially from the center of gravity with angles having equal intervals. The number of particles to be measured was at least 100 or more. Additionally, the measuring environment was set to 25° C.±5° C.

The metal oxide fine particles forming the metal oxide layer 4 are preferably designed to have an average primary particle size from 5 to 250 nm, and more preferably from 10 to 150 nm.

Upon measuring the average primary particle size of the metal oxide fine particles of the metal oxide layer, a photograph of the particles is taken by a scanning electron microscope "JSM-7410" (made by JEOL Ltd.) in a magnification of 100,000 times, and with respect to 50 particles thereof, the respective maximum lengths (the greatest length between arbitrary two points on the circumference of each particle) are measured, and the number-average value thereof is defined as an average primary particle size.

The metal oxide layer 4 is formed by using a wet method.

As the wet method for use in forming the metal oxide layer 4, the same method as a known wet method used for producing the metal oxide (polycondensation product) may be used except that base particles are allowed to exist and that at least the compound A and the compound B are used. For example, a sol-gel method, an interface reaction method or the like may be exemplified.

For example, in a case where a metal oxide fine particle layer is formed on the surface of each base particle by using the sol-gel method, predetermined metal oxide materials (compound A and compound B) are dropped into an aqueous dispersion solution of the base particles under a basic environment, and the system is stirred for a predetermined period of time. Thus, after the alkoxy groups ($OR^1$, $OR^3$) of the compound A and the compound B have been hydrolyzed, a polycondensation reaction takes place so that the metal atoms ($M^1$, $M^2$) are bonded to one another with an oxygen atom being interposed therebetween. As a result, while the metal oxide fine particles are being deposited and formed, they are allowed to adhere to the surface of each base particle to form a metal oxide layer 4 thereon. In the metal oxide layer 4, as shown in FIGS. 1(A) and 1(B), although there are gaps among the fine particles, the polycondensation reaction takes place by the compound A and/or the compound B also on the particle surfaces among the fine particles so that the gaps among the fine particles may be filled with the metal oxide.

As the metal oxide material used for forming the metal oxide layer, the compound A and the compound B, as well as the compound C, if necessary, may be used. As the compound A, not only the compound A, but also an oligomer of the compound A may be used. Moreover, two or more kinds of compounds A may be used. As the compound B, not only the compound B, but also an oligomer of the compound B may be used. Moreover, two or more kinds of the compounds B may be used. As the compound C, the compound C may be used, and two or more kinds of the compounds C may be used. The oligomer is a condensation product of 2 to 20 molecules of the corresponding compound generated by the hydrolyzing reaction of the alkoxy group.

The metal oxide material may be obtained as commercial products.

More specifically, the compound A in which $M^1$ corresponds to a silicon atom and its oligomer are available, for example, as KBE04 (made by Shin-Etsu Chemical Co., Ltd.) and KBM04 (made by Shin-Etsu Chemical Co., Ltd.).

The compound B in which $M^2$ corresponds to a silicon atom and its oligomer are available, for example, as KBE-13 (made by Shin-Etsu Chemical Co., Ltd.), KBE-22 (made by Shin-Etsu Chemical Co., Ltd.) and KBM-22 (made by Shin-Etsu Chemical Co., Ltd.).

Although not particularly limited as long as the object of the present invention can be achieved, the total amount of the compound A and the compound B to be used is normally 5 to 50 parts by weight and more preferably 10 to 35 parts by weight relative to 100 parts by weight of the base particles.

Positively Chargeable Display Particles and Negatively Chargeable Display Particles In the image display apparatus of the present invention, the display particles normally include positively chargeable display particles and negatively chargeable display particles, and in the present invention, both of the positively chargeable display particles and the negatively chargeable display particles are provided with the metal oxide layer.

The metal oxide layer of each of the positively chargeable display particles and the metal oxide layer of each of the negatively chargeable display particles may be independently selected, and, for example, the constituent materials, manufacturing methods and thicknesses of the metal oxide layers, as well as the particle size and the like of the metal oxide fine particles, may be in the aforementioned ranges, independently.

Each of the positively chargeable display particles and the negatively chargeable display particles may be independently provided with or without an organic layer 5.

The organic layer 5 to be formed on the metal oxide layer 4 is produced by surface-treating the metal oxide layer with an organic surface treating agent. More specifically, the base particle on which the metal oxide layer has been formed is subjected to a surface treatment by using the organic surface treating agent.

As the organic surface treating agent, an organic metal compound that is used upon surface-treating inorganic fine particles serving as external additives used in the field of display particles and the like for an image display apparatus may be used, and examples thereof include: an organic silicon compound, an organic aluminum compound and an organic titanium compound. From the viewpoints of charging property and hydrophobicity, the organic silicon compound is used as a preferable organic surface treating agent. The organic metal compound is a compound containing an organic group and metal atoms such as silicon atoms, aluminum atoms and titanium atoms. As the organic group possessed by the organic metal compound, for example, at least one group, selected from the group consisting of an alkyl group having 1 to 10 carbon atoms, and halogen atoms such as fluorine atoms, chlorine atoms and bromine atoms may be used.

The organic surface treating agents for the positively chargeable display particles and the negatively chargeable display particles may be used without being particularly limited, as long as the object of the present invention can be achieved; however, normally, those are used differently depending on the chargeability of display particles to be produced. For example, in a case of forming the positively chargeable display particles, a positively chargeable organic surface treating agent is used alone or in combination with a negatively chargeable organic surface treating agent, and in a case of forming the negatively chargeable display particles, a negatively chargeable organic surface treating agent is used. The reason that the positively chargeable organic surface treating agent and the negatively chargeable organic surface treating agent are preferably used in combination, upon forming the positively chargeable display particles, is because the positively chargeable display particles need to have positive chargeability as well as a predetermined hydrophobic property. The positively chargeable organic surface treating agent is an organic metal compound that tends to apply positive chargeability to display particles when used for the surface treatment, and the negatively chargeable organic surface treating agent is an organic metal compound that tends to apply negative chargeability to display particles when used for the surface treatment.

Specific examples of the positively chargeable organic silicon compound include: aminosilane coupling agents, such as 4-aminobutyldimethylmethoxysilane, 4-aminobutyl triethoxysilane, (aminoethylaminomethyl)phenethyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropyltris(2-ethylhexoxy)silane, 6-(aminohexylaminopropyl)trimethoxysilane, p-aminophenyltrimethoxysilane, aminophenyltriethoxysilane, 3-(1-aminopropoxy)3,3-dimethyl-1-propenyltrimethoxysilane, 3-aminopropyldiethylmethyl silane, 3-aminopropyltris(methoxyethoxyethoxy)silane, 3-aminopropyldimethylethoxysilane, 3-aminopropylmethyldiethoxysilane, 3-aminopropyltriethoxysilane, 3-aminopropyltrimethoxysilane, 3-aminopropyltris(trimethylsiloxy)silane, ω-aminoundecyltrimethoxysilane and amino-modified silicone oil; cyclic silazanes, such as N-methyl-aza-2,2,4-trimethylsilacyclopentrane, N-aminoethyl-aza-2,2,4-trimethylsilacyclopentrane, N-n-butyl-aza-2,2-dimethoxysilacyclopentrane; and mixtures of these.

Specific examples of the negatively chargeable organic silicon compound include: organic silazanes such as hexamethyl disilazane, trimethyl disilazane, tetramethyl disilazane, hexamethylcyclo trisilazane and heptamethyl disilazane; organic siloxanes such as methylhydrogen disiloxane, dimethyldisiloxane, hexamethyl disiloxane, 1,3-divinyltetramethyl disiloxane, 1,3-diphenyltetramethyl disiloxane, methylhydrogenpolysiloxane, dimethylpolysiloxane, and amino-modified siloxane; organic silane coupling agents, such as trimethylsilane, octyltrimethoxysilane, trimethylchlorosilane, trimethylethoxysilane, dimethyldichlorosilane, dichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethyldiethoxysilane, dimethyldimethoxysilane, diphenyldiethoxysilane; and mixtures of these.

Specific examples of the negatively chargeable organic aluminum compound include: organic aluminum coupling agents, such as acetoalkoxyaluminum diisopropylate and alkylacetoacetate aluminum diisopropylate; and mixtures of these.

Specific examples of the negatively chargeable organic titanium compound include: organic titanium coupling agents, such as propyltrimethoxy titanium, propyldimethoxymethyl titanium, propyltriethoxy titanium, butyltrimethoxy titanium, butyldimethoxymethyl titanium, butyltriethoxy titanium, vinyltrimethoxy titanium, vinyldimethoxymethyl titanium, vinyltriethoxy titanium, vinyldiethoxymethyl titanium, hexyltrimethoxy titanium, hexyldimethoxymethyl titanium, hexyltriethoxy titanium, hexyldiethoxymethyl titanium, phenyltrimethoxy titanium, phenyldimethoxymethyl titanium, phenyltriethoxy titanium, phenyldiethoxymethyl titanium, γ-glycidoxypropyltrimethoxy titanium, γ-glycidoxypropyldimethoxy methyl titanium, γ-glycidoxypropyltriethoxy titanium and γ-glycidoxypropyldiethoxymethyl titanium; and mixtures of these.

As the surface treatment method, the same method as a known surface treatment method for inorganic fine particles serving as external additives used in the field of display particles and the like for an image display apparatus may be used, except that base particles, each having a metal oxide layer formed thereon, are used as the particles to be treated.

For example, to a dispersion solution of base particles, each having the metal oxide layer formed thereon, an organic surface treatment agent is added, and by stirring the resulting system at room temperature or under a heating process, the treatment agent is allowed to react so that the organic layer can be formed on the metal oxide layer. In this case, however, since the positively chargeable organic surface treatment agent has high hydrophilicity, it is not possible to obtain high hydrophobicity when used alone. Therefore, in the surface treatment for the positively chargeable display particles, after having been treated by the positively chargeable organic surface treatment agent, the resulting particles are preferably treated by the negatively chargeable organic surface treatment agent that provides high hydrophobicity.

Although not particularly limited, the thickness of the organic layer 45 is normally 0.1 to 50 nm, and preferably 1 to 20 nm.

The thickness of the organic layer can be measured by using the same method as that for the metal oxide layer. That is, the distance from the outermost surface of each of the particles to the base particle was measured, and the difference between the average value thereof and the film thickness of the metal oxide layer was calculated as the thickness of the organic layer.

The positively chargeable display particles and the negatively chargeable display particles are charged to a predetermined polarity, for example, by allowing them to be made in frictional contact with each other, or to be made in frictional contact with a carrier serving as a charge applying material. The charging polarity can be controlled by the kind of a carrier to be used for charging the positively chargeable display particles and the negatively chargeable display particles upon producing an image display apparatus, the kinds of the resin and charge control agent contained in the base particles, the kinds of the surface treatment agent used for forming the organic layer, and the like.

The volume average particle size of the display particles is normally 0.5 to 50 μm, and preferably 1 to 20 μm. Each of the volume average particle sizes of the positively chargeable display particles and the negatively chargeable display particles is preferably in the above-mentioned range, independently.

The volume average particle size is given as a volume reference median diameter (d50 diameter), and can be measured and calculated by using a device in which a Multisizer 3 (made by Beckman Coulter, Inc.) is connected to a computer system for use in data processing.

The measuring sequence includes processes in which, after a sample (0.02 g) has been added to and adapted in 20 ml of a surfactant solution (used for dispersing particles, and formed as a surfactant solution by diluting a neutral detergent containing the surfactant component with pure water ten times as much), the resulting solution is subjected to an ultrasonic dispersing process for 1 minute so that a dispersion solution is prepared. This dispersion solution is injected into a beaker containing ISOTON II (made by Beckman Coulter, Inc.) inside a sample stand by using a pipet until it has reached a measured concentration of 10%, and by setting a measuring machine count to 2500 pieces, a measuring process is carried out. Additionally, the Multisizer 3 having its aperture diameter set to 100 μm is used.

The mixing ratio between the positively chargeable display particles and the negatively chargeable display particles is preferably 1/3 to 3/1, in particular, 1/2 to 2/1 in weight ratio.

The display particles of the present invention, that is, the positively chargeable display particles and the negatively chargeable display particles, may be used, with external additives known in the field of display particles for the image display apparatus added thereto. As the external additives, examples thereof include inorganic fine particles such as silica, titania and alumina, and organic fine particles such as those made from polyacrylic resin, melamine resin and polystyrene resin. The average primary particle size of the external additives is preferably 5 to 250 nm, and more preferably 10 to 150 nm.

Base Particles

In both of the positively chargeable display particles and the negatively chargeable display particles, the base particles are colored resin particles that contain at least a resin and a colorant, and colorants having different colors are contained between those base particles contained in the positively chargeable display particles and those base particles contained in the negatively chargeable display particles.

The expression "having different colors" means that, upon generating an electric field between the substrates in an image display apparatus, which will be described later in detail, there are differences in hue, lightness, saturation and the like between those display particles that are moved toward the substrate on the upstream side in the visually recognizable direction and adhered thereto and those display particles that are left on the substrate on the downstream side in the visually recognizable direction and adhered thereto. Based upon these differences, a displayed image is visually recognized. The base particles of the positively chargeable display particles and the negatively chargeable display particles are used, for example, as combinations between white base particles and black base particles. The colors thereof can be controlled by the kinds of colorants contained in the base particles (black: carbon black, iron oxide, aniline black, white: titanium oxide, zinc oxide, zinc sulfate).

The resin for forming base particles of positively chargeable display particles and negatively chargeable display particles is not particularly limited, but typically includes a polymer referred to as a vinyl-based resin, as shown below, and in addition to the vinyl-based resin, for example, a condensation-based resin such as a polyamide resin, a polyester resin, a polycarbonate resin and an epoxy resin may be used. In addition to a polystyrene resin, a polyacrylic resin and polymethacrylic resin, specific examples of the vinyl-based resin include a polyolefin resin formed by using a monomer such as an ethylene monomer and a propylene monomer, or the like. Moreover, as resins other than the vinyl-based resin, in addition to the above-mentioned condensation-based resin, for example, a polyether resin, a polysulfone resin, a polyurethane resin, a fluorine-based resin, a silicone-based resin or the like may be used.

As the polymer for forming the resin used for forming the base particles, in addition to those obtained by using at least one kind of polymerizable monomers forming these resins, a plurality of kinds of polymerizable monomers may be combined and used for the polymer. Upon forming a resin by combining a plurality of kinds of polymerizable monomers with one another, in addition to methods in which a copolymer such as a block copolymer, a graft copolymer and a random copolymer, is formed, a polymer blending method in which a plurality of kinds of resins are mixed with one another may be used.

For example, among the resins, since base particles containing a fluorine-based resin tend to be charged to a negative polarity, the corresponding base particles are effectively used as the negatively chargeable display particles. Moreover, for example, since base particles containing a polyamide-based resin or a polymethacrylic resin tend to be discharged to a positive polarity, the corresponding base particles are effectively used as the positively chargeable display particles. A styrene acryl-based resin can be effectively used in base particles of both of the positively chargeable display particles and the negatively chargeable display particles.

The weight-average molecular weight of the resin forming the base particles is normally 5000 to 200000, and more preferably 15000 to 100000.

In the present specification, the weight-average molecular weight is given as a value measured by an HLC-8220 (made by Tosoh Corporation).

As the colorant, not particularly limited, known pigments in the field of the display particles for the image display apparatus may be used. Among these, as a white pigment for forming the white base particles, for example, zinc oxide (zinc white), titanium oxide, antimony white, zinc sulfide, barium titanate, calcium titanate and strontium titanate may be used, and among these, titanium oxide is preferably used. Moreover, as a black pigment for forming the black base particles, for example, carbon black, copper oxide, manganese dioxide, aniline black, activated carbon or the like may be used, and among these, carbon black is preferably used. Although not particularly limited, the content of the colorant is, for example, 1 to 200 parts by weight relative to 100 parts by weight of the resin.

The base particles may contain a charge control agent used in the field of the display particles for image display apparatuses.

As the charge control agent, not particularly limited, known charge control agents in the field of the display particles for the image display apparatus may be used. Among these, the base particles containing a negative charge control agent, such as a salicylic acid metal complex, a metal-containing azo dye, a quaternary ammonium salt compound, nitroimidazole derivatives and the like, are effectively used as the base particles of the negatively chargeable display particle. Moreover, the base particles containing a positive charge control agent, such as a nigrosine-based dye, a triphenylmethane compound, imidazole derivatives and the like, are effectively used as the base particles of the positively chargeable display particles. Although not particularly limited, the content of the charge control agent may be, for example, 0.1 to 10 parts by weight relative to 100 parts by weight of the resin.

The volume-average particle size of the base particles may be such a value as to set the volume-average particle size of the display particles in the above-mentioned range.

As the method for manufacturing the base particles, not particularly limited, known methods for manufacturing particles containing a resin and a colorant, such as a method for manufacturing a toner to be used for image formation in an electrophotographic system, may be adopted and used. As a specific method for manufacturing the base particles, for example, the following methods may be used.

(1) After kneading a resin and a colorant, the resulting matter is subjected to respective pulverizing and classifying processes so that base particles are formed;
(2) A polymerizable monomer and a colorant are mechanically stirred in an aqueous medium to form droplets, and these are then subjected to a polymerizing process to form base particles, which is a so-called suspension polymerization method;
(3) A polymerizable monomer is dropped into an aqueous medium in which a surfactant is contained, and after this has been subjected to a polymerizing reaction in a micelle so that polymer particles in a range of 100 to 150 nm are formed, colorant particles and a coagulating agent are then added thereto so that these particles are aggregated and fused to produce base particles, which is a so-called emulsion polymerization-aggregation method.

Image Display Apparatus

An image display apparatus of the present invention is characterized by including the display particles, in particular, the positively chargeable display particles and negatively chargeable display particles. The following description will discuss the image display apparatus of the present invention in detail. Additionally, the image display apparatus of the present invention is referred to as "powder display".

The image display apparatus of the present invention has a structure in which the display particles in a powder state are sealed between two substrates at least one of which is transparent, and by generating an electric field between the substrates, the display particles are moved so that an image is displayed.

Figure 2:
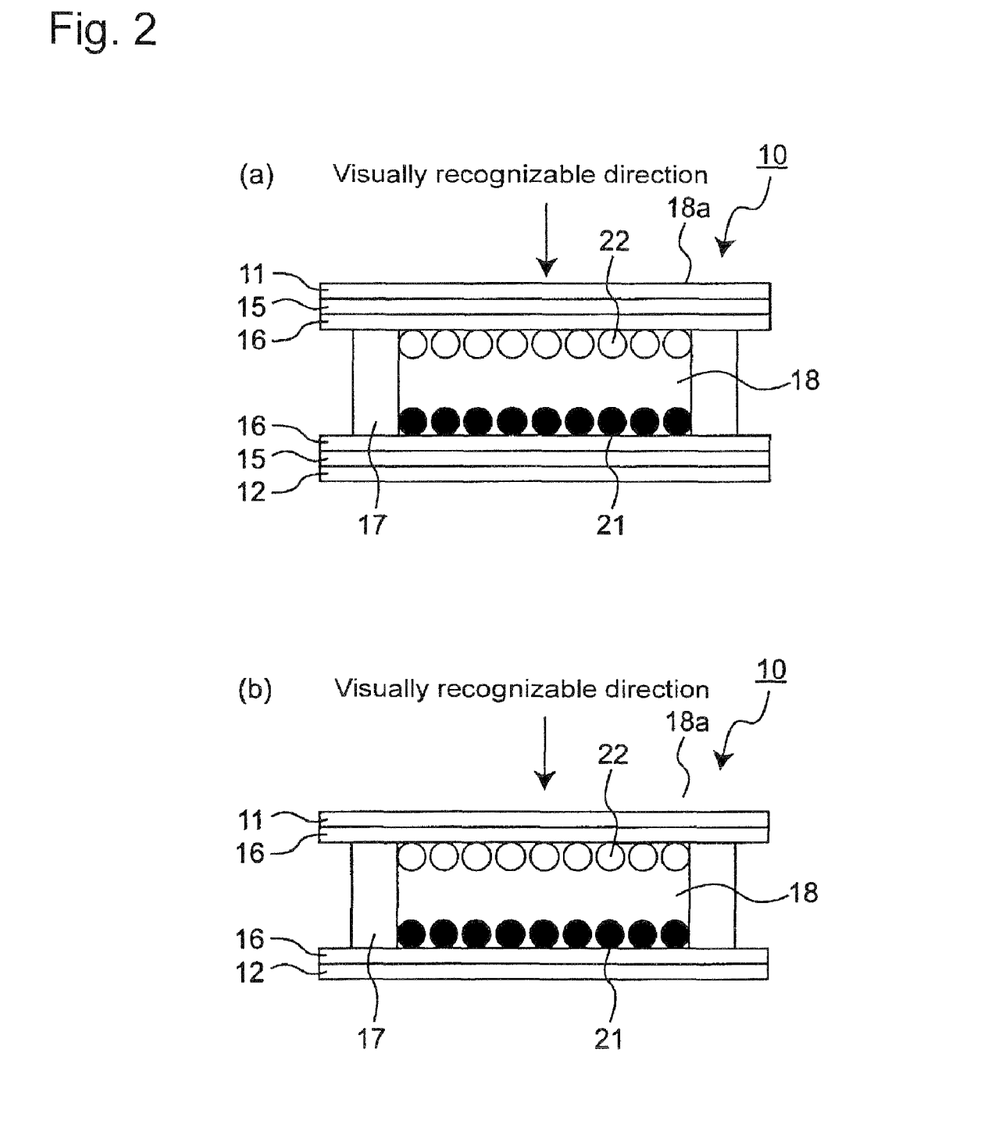
FIG. 2 is a schematic drawing that shows one example of a cross-sectional structure of an image display apparatus.
Figure 4:
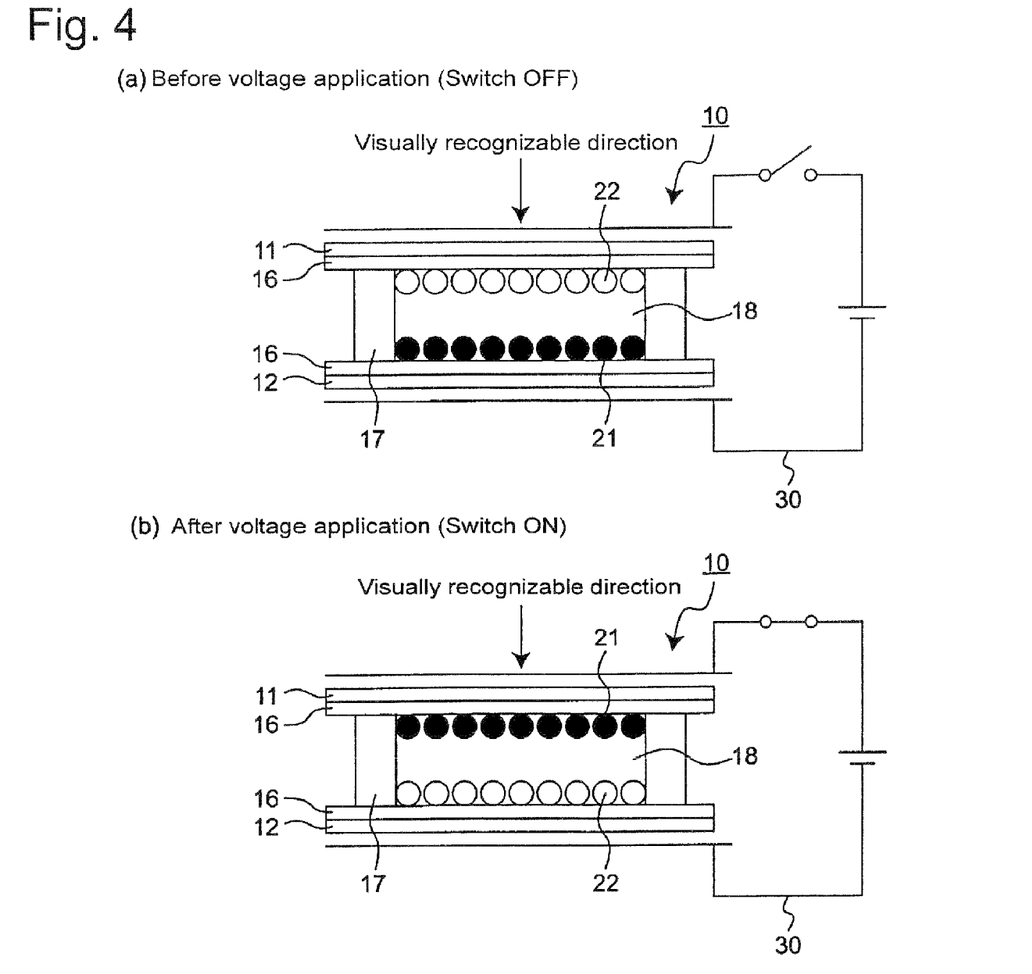
FIG. 4 is a schematic drawing that shows another example of movements of display particles due to a voltage application between the substrates.

FIG. 2 shows typical cross sectional structures of image display apparatuses of the present invention. FIG. 2(a) shows a structure in which an electrode 15 having a layer structure is formed on each of substrates 11 and 12, with an insulating layer 16 being formed on the surface of each electrode 15. The image display apparatus shown in FIG. 2(b) has a structure in which no electrode is provided in the image display apparatus, and is designed so that an electric field is applied by electrodes provided on the outside of the apparatus so as to move the display particles. In FIG. 2(a) and FIG. 2(b), the same reference numerals represent the same members. FIG. 2 indicates FIG. 2(a) and FIG. 2(b) in a manner to be included therein. An image display apparatus 10 of FIG. 2 is supposed to be used for viewing images from the substrate 11 side as shown in the figure; however, the present invention is not intended to be limited by the structure in which images are viewed from the substrate 11 side. Moreover, since the apparatus is provided with no electrode 15, the apparatus having a type indicated by FIG. 2(b) can be simplified in its apparatus structure and is advantageous in that its manufacturing processes can be shortened. FIG. 4 shows a state in which the image display apparatus 10 of the type shown in FIG. 2(b) is set in a device capable of applying a voltage so that the voltage is applied thereto. Additionally, the cross-sectional structure of the image display apparatus of the present invention is not intended to be limited by those shown in FIGS. 2(a) and 2(b).

On the outermost portion of the image display apparatus 10 of FIG. 2(a), two substrates 11 and 12 that form a case constituting the image display apparatus are arranged so as to be opposed to each other. Electrodes 15 used for applying a voltage are provided on the respective surfaces of the substrates 11 and 12 on the mutually opposed sides, and insulating layers 16 are further formed on the respective electrodes 15. The electrode 15 and the insulating layer 16 are provided on each of the substrates 11 and 12, and display particles are located in a gap 18 that is formed by making the surfaces each having the electrode 15 and the insulating layer 16 face to face with each other. The image display apparatus 10 shown in FIG. 2 has two types of display particles, that is, black display particles 21 (hereinafter, referred to as "black particles") and white display particles 22 (hereinafter, referred to as "white particles"), located in the gas 18 as display particles. The image display apparatus 10 of FIG. 2 has a structure in which the gap 18 is surrounded by the substrates 11, and 12 and two barrier ribs 17 from four sides, with the display particles being sealed in the gap 18.

The thickness of the gap 18 is not particularly limited as long as it is kept in such a range as to allow the sealed display particles to move and properly maintain the contrast of an image, and is normally in a range from 10 μm to 500 μm, and preferably from 10 μm to 100 μm. The volume-filling-ratio of the display particles in the gap 18 is 5% to 70%, and preferably from 30% to 60%. By making the volume-filling-ratio of the display particles within the above-mentioned range, the display particles are allowed to move smoothly in the gap 18, and an image with superior contrast can be obtained.

Next, the following description will discuss behaviors of display particles in the gap 18 of the image display apparatus 10.

In the image display apparatus of the present invention, upon application of a voltage between the two substrates so that an electric field is formed therein, charged display particles are allowed to move in the electric field direction. In this manner, by applying a voltage between the substrates where the display particles are located, the charged display particles are allowed to move between the substrates so that an image displaying operation is carried out.

The image displaying operation in the image display apparatus of the present invention is carried out through the following processes.

(1) Display particles to be used for display media are charged by using a known method such as frictional charging with a carrier or the like.
(2) The display particles are sealed between two opposed substrates, and in this state, a voltage is applied between the substrates.
(3) By the voltage application between the substrates, an electric field is formed between the substrates.
(4) The display particles are attracted toward the substrate surfaces in the electric field direction on the side opposite to the polarity of the display particles by a function of a force of the electric field between the electrodes so that an image displaying operation is carried out.
(5) Moreover, by changing the electric field direction between the substrates, the moving directions of the display particles are switched. By switching the moving directions, it is possible to change the image display in various ways.

As the charging method of display particles by the above-mentioned known method, for example, a method is proposed in which the display particles are made in contact with the carrier so as to be charged by frictional charging, and another method is proposed in which display particles of two colors having different charging polarities are mixed and stirred so that the display particles are charged by frictional charging among the particles of the two types. In the present invention, the carrier is used, and the charged display particles are preferably sealed between the substrates.

Figure 3:
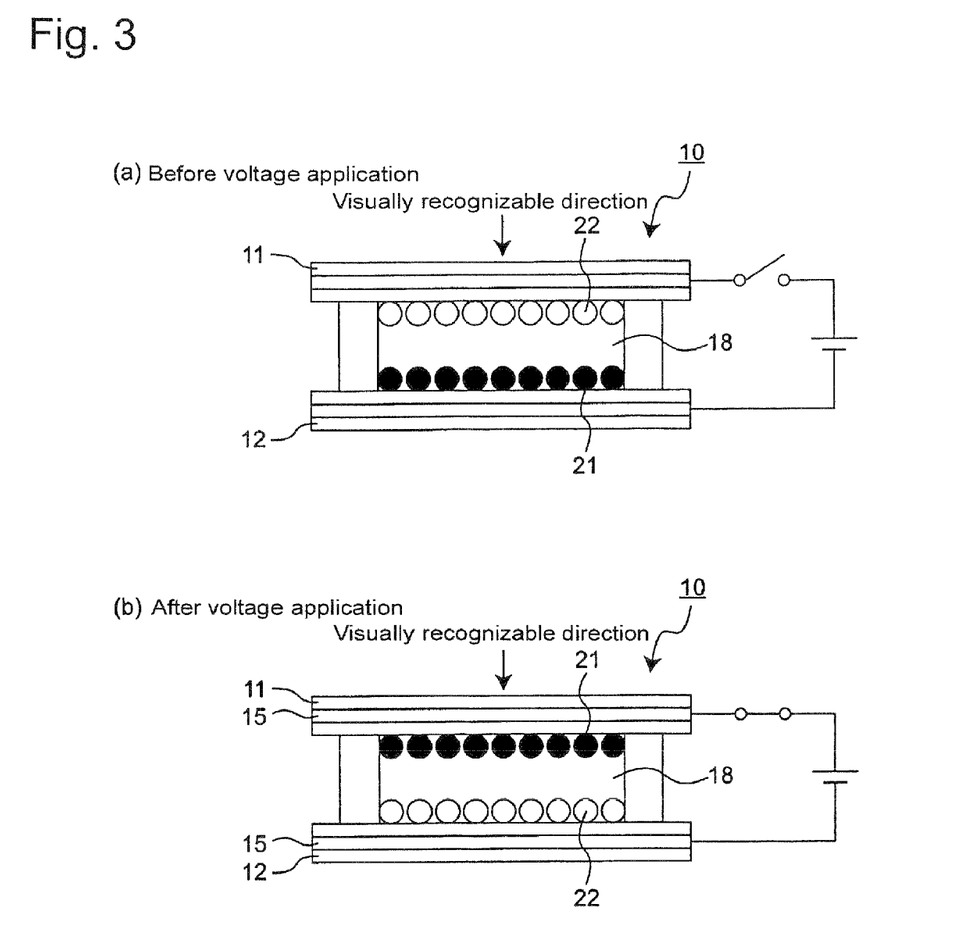
FIG. 3 is a schematic drawing that shows one example of movements of display particles due to a voltage application between substrates.

FIGS. 3 and 4 show examples of movements of display particles in response to a voltage application between the substrates.

FIG. 3(a) shows a state prior to the voltage application between substrates 11 and 12, and prior to the voltage application, white particles 22 positively charged are located near the substrate 11 on the visible side. This state shows that the image display apparatus 10 displays a white image. Moreover, FIG. 3(b) shows a state after the application of voltage to the electrode 15 in which the negatively charged black particles 21 have been moved close to the substrate 11 on the visible side by an application of a positive voltage to the substrate 11, while the white particles 22 have been moved to the substrate 12 side. In this state, the image display apparatus 10 displays a black image.

FIG. 4 show a structure in which the image display apparatus 10 shown in FIG. 2(b) of a type without electrodes is connected to a voltage application device 30, and also show a state prior to an application of a voltage in this state (FIG. 4(a)) and a state after the application of the voltage (FIG. 4(b)). Similarly in the image display apparatus 10 having the electrode 15, the image display apparatus 10 of the type shown in FIG. 2(b) also has a state in which the negatively charged black particles 21 have been moved close to the substrate 11 on the visible side by the application of a positive voltage to the substrate 11, while the positively charged white particles 22 have been moved to the substrate 12 side.

The following description will discuss substrates 11 and 12, an electrode 15, an insulating layer 16 and barrier ribs 17 that constitute the image display apparatus 10 shown in FIG. 2.

First, the substrates 11 and 12 constituting the image display apparatus 10 will be described. In the image display apparatus 10, since the viewer visually recognizes an image formed by the display particles from at least one of the sides of the substrates 11 and 12, the substrate to be placed on the visible side by the viewer needs to be formed by a transparent material. Therefore, the substrate to be used on the image visible side by the viewer is preferably formed by a light-transmitting material having a visible light transmittance of 80% or more, and the visible light transmittance of 80% or more makes it possible to provide sufficient visibility. Of the substrates constituting the image display apparatus 10, the substrate to be placed on the side opposite to the image visible side is not necessarily made from a transparent material.

The thicknesses of the substrates 11 and 12 are preferably 2 μm to 5 mm, and more preferably 5 μm to 2 mm, respectively. When the thicknesses of the substrates 11 and 12 are set within the above-mentioned range, it is possible to allow the image display apparatus 10 to have sufficient strength, with the gap between the substrates being maintained uniformly. Moreover, by making the thicknesses of the substrates within the above-mentioned range, a compact, light-weight image display apparatus can be provided so that the application of the image display apparatus can be promoted in a wider field. Moreover, by making the thickness of the substrate on the image visible side within the above-mentioned range, it is possible to provide accurate visual recognition of a displayed image and consequently to prevent problems with display quality.

As the material having a visible light transmittance of 80% or more, examples thereof include an inorganic material, such as glass and quartz, having no flexibility, an organic material typically represented by a resin material, which will be described later, and a metal sheet. Among these, the organic material and the metal sheet allow the image display apparatus to have a certain degree of flexibility. As the resin material capable of providing a visible light transmittance of 80% or more, for example, polyester resins typically represented by polyethylene terephthalate and polyethylene naphthalate, polycarbonate resin, polyether sulfone resin, polyimide resin and the like may be used. Moreover, transparent resins obtained by radical-polymerizing a vinyl-based polymerizable monomer such as acrylic resin that is a polymer of acrylic acid esters and methacrylic acid esters typically represented by polymethyl methacrylate (PMMA) or polyethylene resin may be used.

The electrodes 15 are provided on the surfaces of the substrates 11 and 12, and used for forming an electric field between the substrates, that is, in the gap 18, by applying a voltage. In the same manner as in the aforementioned substrates, the electrode 15 to be formed on the image visible side to the viewer needs to be formed by using a transparent material.

The thickness of the electrode to be provided on the image visible side needs to be set to such a level as to ensure conductivity and also to avoid problems with light-transmitting property, and more specifically, it is preferably 3 nm to 1 μm, and more preferably 5 nm to 400 nm. Moreover, the visible light transmittance of the electrode to be provided on the image visible side is preferably 80% or more in the same manner as that of the substrate. The thickness of the electrode to be provided on the side opposite to the image visible side is preferably within the above-mentioned range, but the electrode is not required to be made from a transparent material.

As the constituent material for the electrodes 15, examples thereof include: a metal material and a conductive metal oxide, or a conductive polymer material. Specific examples of the metal material include: aluminum, silver, nickel, copper, gold and the like, and specific examples of the conductive metal oxide include: indium-tin oxide (ITO), indium oxide, antimony-tin oxide (ATO), tin oxide, zinc oxide and the like. Moreover, examples of the conductive polymer material include: polyaniline, polypyrrole, polythiophene, polyacetylene, and the like.

As the method for forming the electrode 15 on the substrates 11 and 12, for example, in a case of forming a thin-film electrode, a sputtering method, a vacuum vapor deposition method, a chemical vapor deposition method (CVD method) and a coating method are proposed. Moreover, another method may be proposed in which a conductive material is mixed in a solvent and a binder resin and this mixture is applied to a substrate so as to form an electrode.

The insulating layer 16 is provided on the surface of the electrode 15, and has such a structure that the surface of the insulating layer 16 is made in contact with the display particles 21 and 22; however, the insulating layer 16 is not necessarily required to be installed. The insulating layer 16 has a function for alleviating a change in quantity of charge due to a voltage applied upon moving the display particles 21 and 22. Moreover, by applying a resin having a structure that exerts high hydrophobicity or irregularities thereto, the insulating layer makes it possible to reduce the physical adhesion force to the display particles, and consequently to reduce the driving voltage. As the material for constituting the insulating layer 16, such a material that has an electrical insulating property, can be formed into a thin film, and also has a transparent property, if necessary, is preferably used. The insulating layer to be provided on the image visible side is preferably designed to have a visible light transmittance of 80% or more in the same manner as in the substrate. Specific examples thereof include: silicone resin, acrylic resin, polycarbonate resin, and the like.

The thickness of the insulating layer 16 is preferably 0.01 µm or more to 10.0 µm or less. That is, when the thickness of the insulating layer 16 is within the above-mentioned range, it is possible to move the display particles 21, 22 without applying a high voltage between the electrodes 15, and this structure is preferable because, for example, an image displaying process can be carried out by applying a voltage in such a level as to be applied during an image forming process by the use of an electrophoretic method.

Figure 5:
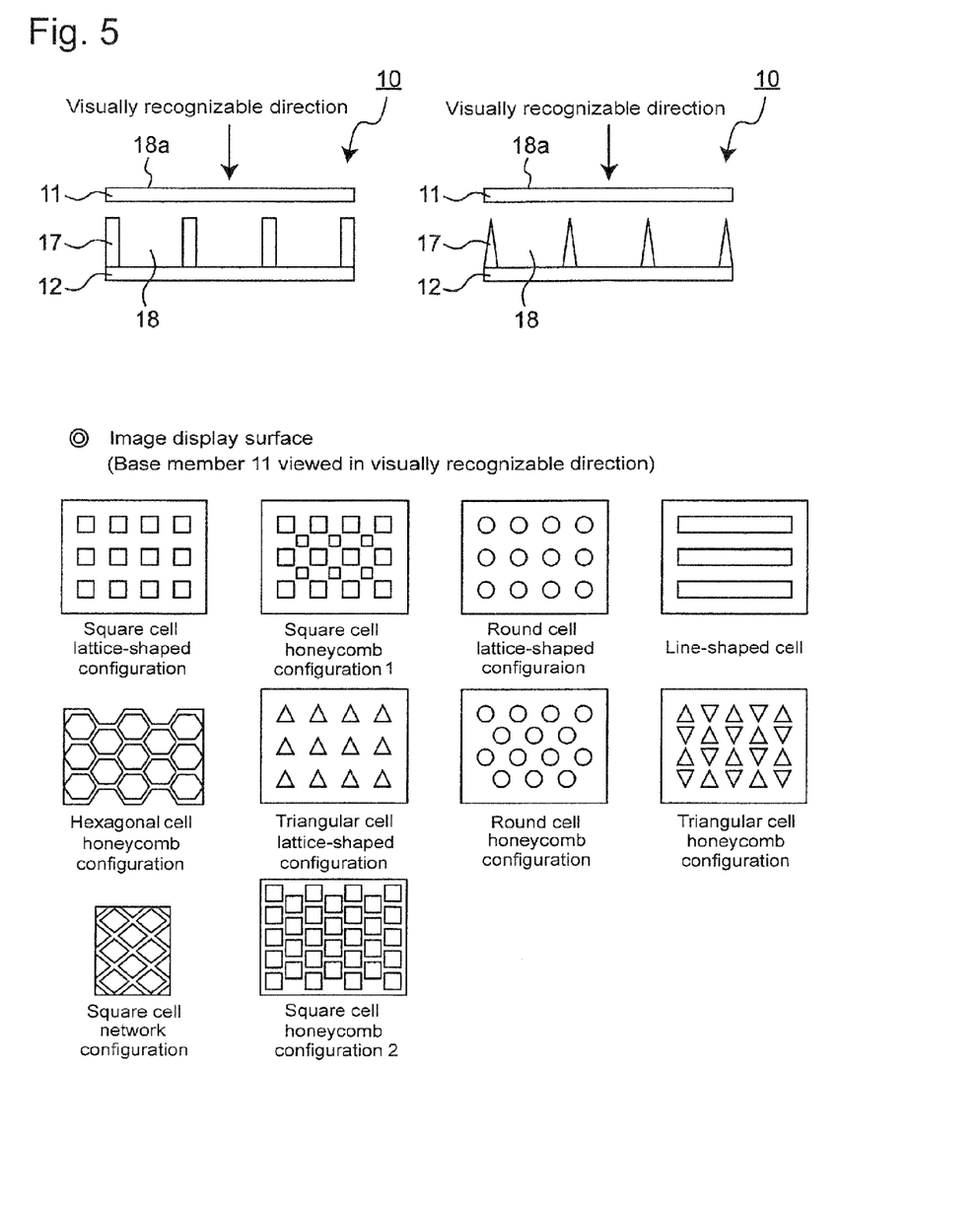
FIG. 5 is a schematic drawing that shows an example for forming an image display surface.

The barrier rib 17 is used for ensuring the gap 18 between the substrates, and as shown on the right side and left side in the upper stage of FIG. 5, these may be formed not only on the edge portion of the substrate 11, 12, but also inside thereof, if necessary. The width of the barrier rib 17, in particular, the thickness of the barrier rib on the image display surface 18a side, is preferably made as thin as possible from the viewpoint of ensuring clearness of a displayed image, as shown on the right side in the upper stage of FIG. 5.

The barrier rib 17 to be formed inside of the substrate 11, 12 may be formed continuously, or may be formed intermittently, in a direction from the surface to rear face, in figures shown on the right side and left side in the upper stage of FIG. 5.

By controlling the shape and layout of the barrier ribs 17, the cell of the gap 18 divided by the barrier ribs 17 can be arranged with various shapes. Examples of the shape and arrangement of the cells at the time when the gap 18 is viewed in the visually recognizable direction of the substrate 11 are shown in the lower stage of FIG. 5. As shown in the lower stage of FIG. 5, a plurality of cells with a square shape, a triangular shape, a line shape, a round shape, a hexagonal shape or the like can be arranged into a honeycomb shape and a network shape.

The barrier ribs 17 can be formed by carrying out a shaping process on the substrate on the side opposite to the image-recognizing side, for example, by using the following method. As the method for shaping the barrier ribs 17, for example, a method for forming irregularities by using an embossing process and a thermal press injection molding process to be carried out on a resin material or the like, a photolithography method, a screen printing method and the like are proposed.

The image display apparatus can be manufactured by an electrophotographic developing system as described below.

Figure 6:
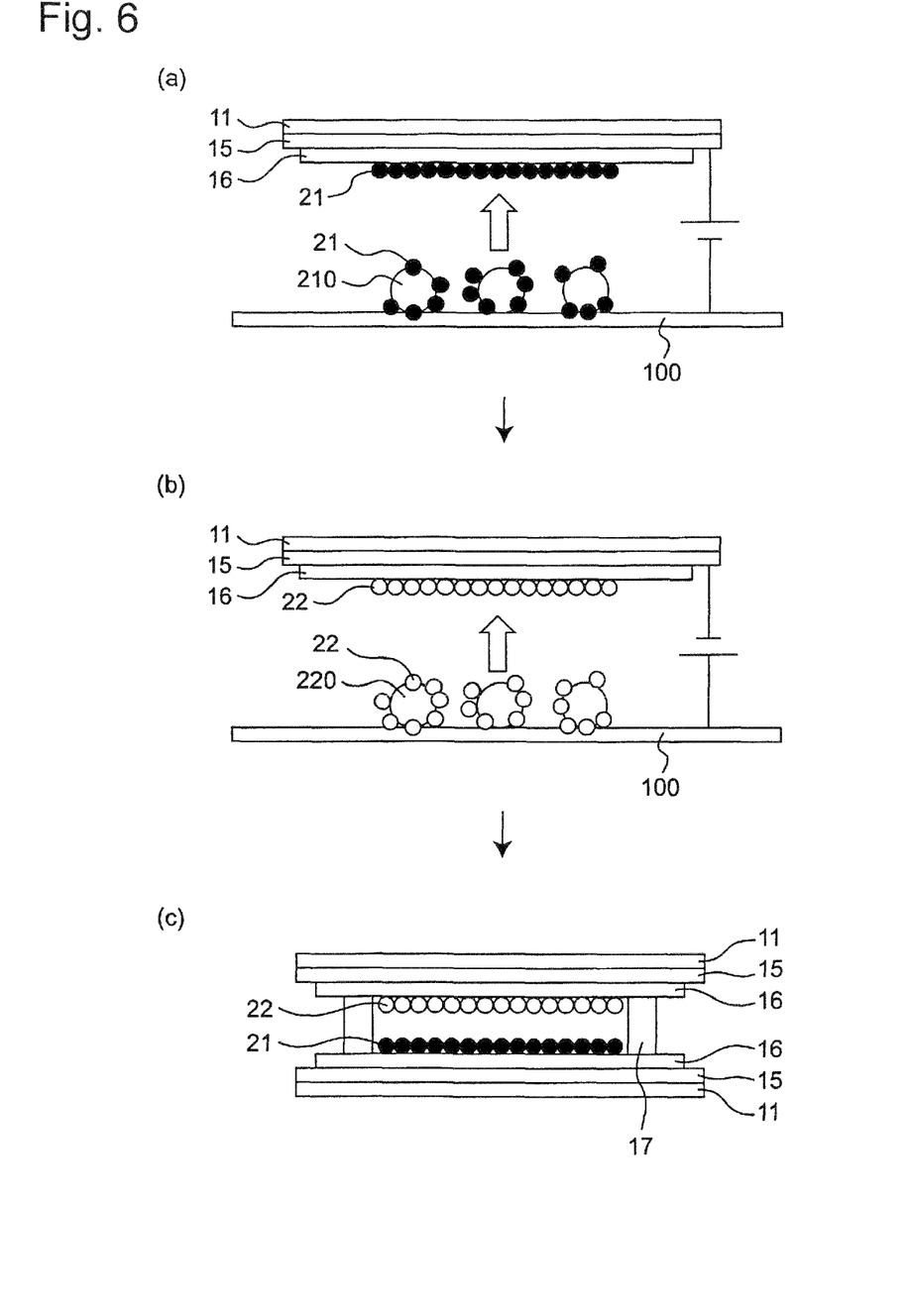
FIG. 6 is a schematic drawing that shows one example of a method for sealing display particles.

An electrode 15 and an insulating layer 16, if necessary, are formed on each of two substrates 11 and 12 so that a pair of substrates with electrodes formed thereon are obtained. By mixing display particles 21 and a carrier 210, the display particles 21 are negatively charged, and the mixtures (21, 210) are placed on a conductive stage 100 as shown in FIG. 6(a), and one of the substrates with electrodes is placed with a predetermined gap being set from the stage 100. Next, as shown in FIG. 6(a), a DC voltage having a positive polarity and an AC voltage are applied to the electrode 15 so that the negatively charged display particles 21 are allowed to adhere thereto.

By mixing display particles 22 and a carrier 220, the display particles 22 are positively charged, and the mixtures (22, 220) are placed on the conductive stage 100, as shown in FIG. 6(b), and the other substrate with electrodes is placed with a predetermined gap being set from the stage 100. Next, as shown in FIG. 6(b), a DC voltage having a negative polarity and an AC voltage are applied to the electrode 15 so that the positively charged display particles 22 are allowed to adhere thereto. The substrate with electrodes to which the negatively charged display particles have been adhered and the substrate with electrodes to which the positively charged display particles have been adhered are superposed as shown in FIG. 6(c) by adjusting the barrier ribs so as to form a predetermined gap, and the peripheral portions of the substrates are bonded so that an image display apparatus can be obtained.

As the carrier 210 used for negatively charging the display particles, for example, a coat-type carrier formed by coating magnetic particles such as ferrite with a resin such as a cyclohexylmethacrylate resin is effectively used.

As the carrier 220 used for the positively charging display particles, for example, a coat-type carrier formed by coating magnetic particles such as ferrite with a resin such as a fluoridated acrylate resin is effectively used.

EXAMPLE

Example 1

Production of Black Display Particles
Black Base Particles

The following resin and carbon black were loaded into a Henschel mixer (made by Mitsui-Miike Machinery Co., Ltd.) and a peripheral speed of stirring blades was set to 25 m/s so that a mixing process was carried out for five minutes to provide a mixture.

Styrene acrylic resin (weight average molecular weight 20,000) 100 parts by weight Carbon black (average primary particle size: 25 nm) 10 parts by weight The above-mentioned mixture was kneaded by a twin-screw extrusion kneader, coarsely pulverized by a hummer mill, then subjected to a grinding process by a turbo-mill grinder (made by Turbo Kogyo Co., Ltd.), and further subjected to a fine-particle classifying process by a gas-flow classifier utilizing a Coanda effect so that black base particles having a volume-average particle size of 8.2 µm were produced.

Metal Oxide Layer

The black base particles (30 g) were dispersed in 1000 g of pure water, and 10 g of ammonia water (28 wt %) was added thereto, and this was stirred for 5 minutes. Next, tetraethoxysilane (8.5 g) and dimethyldiethoxysilane (8.5 g) were dropped thereto in 3 hours, and this was stirred for 5 hours at room temperature. The resulting precipitate was filtrated, and after having been washed with pure water, this was dried at 60° C. for 24 hours so that black display particles in which a silica fine particle layer was formed on the surface of each of the black base particles were obtained.

Organic Layer of Black Display Particle

The black display particles (10 g) in which the metal oxide layers were formed were added to a mixed solution of 50 g of cyclohexane and 10 g of hexamethyldisilazane, and this dispersion solution was heated to 50° C., while being stirred, so as to react with each other for 3 hours. Next, the solvent in this dispersion solution was distilled off at 50° C. under a reduced pressure so that black display particles were obtained.

Production of White Display Particles
White Base Particles

The following resin and titanium oxide were loaded into a Henschel mixer (made by Mitsui-Miike machinery Co., Ltd.) and a peripheral speed of stirring blades was set to 25 m/s so that a mixing process was carried out for five minutes to provide a mixture.

Styrene acrylic resin (weight average molecular weight 20,000) 100 parts by weight Rutile type titanium dioxide (R-630: made by Ishihara Sangyo Co., Ltd.) 100 parts by weight The above-mentioned mixture was kneaded by a twin-screw extrusion kneader, coarsely pulverized by a hummer mill, then subjected to a grinding process by a turbo-mill grinder (made by Turbo Kogyo Co., Ltd.), and further subjected to a fine-particle classifying process by a gas-flow classifier utilizing a Coanda effect so that white base particles having a volume-average particle size of 8.0 μm were produced.

Metal Oxide Layer

The white base particles (30 g) were dispersed in 1000 g of pure water, and 10 g of ammonia water (28 wt %) was added thereto, and this was stirred for 5 minutes. Next, tetraethoxysilane (8.5 g) and dimethyldiethoxysilane (8.5 g) were dropped thereto in 3 hours, and this was stirred for 5 hours at room temperature. The resulting precipitate was filtrated, and after having been washed with pure water, this was dried at 60° C. for 24 hours so that white display particles in which a silica fine particle layer was formed on the surface of each of the white base particles were obtained.

Organic Layer of White Display Particle

To 25 g of an aqueous solution of acetic acid (1 wt %) was added 4 g of N-(2-aminoethyl)-3-aminopropyltriethoxysilane (first processing agent), and this was stirred at room temperature for 15 minutes. Thereafter, to the mixed solution were added 10 g of the resulting white display particles in which the metal oxide layers were formed, and this was stirred at 50° C. for 3 hours. The solvent in this dispersion solution was distilled off at 50° C. under a reduced pressure. Thereafter, the resulting white particles were added to a mixed solution of 50 g of cyclohexane and 10 g of hexamethyldisilazane (second processing agent), and this was heated at 50° C., while being stirred, so as to react with each other for 3 hours. Next, the solvent in this dispersion solution was distilled off at 50° C. under a reduced pressure so that white display particles were obtained.

Carrier A for Charging White Display Particles

To 100 parts by weight of ferrite cores having an average particle size of 80 μm were added 2 parts of fluoridated acrylate resin particles, and these materials were put into a horizontal rotation blade type mixer, and mixed and stirred at 22° C. for 10 minutes under a condition of 8 m/sec in the peripheral speed of the horizontal rotation blades. The resulting mixture was then heated to 90° C., and stirred for 40 minutes so that carrier A was prepared.

Carrier B for Charging Black Display Particles

To 100 parts by weight of ferrite cores having an average particle size of 80 μm were added 2 parts of cyclohexylmethacrylate resin particles, and these materials were put into a horizontal rotation blade type mixer, and mixed and stirred at 22° C. for 10 minutes under a condition of 8 m/sec in the peripheral speed of the horizontal rotation blades. The resulting mixture was then heated to 90° C., and stirred for 40 minutes so that carrier B was prepared.

Production of Image Display Apparatus

An image display apparatus was manufactured in accordance with the following method so as to have the same structure as that of FIG. 2(a). Two sheets of glass substrates 11 each having a length of 80 mm, a width of 50 mm and a thickness of 0.7 mm were prepared, and an electrode 15 made of an indium-tin oxide (ITO) film (resistance: 30Ω/□) having a thickness of 300 nm was formed on each of the substrate surfaces by using a vapor deposition method. Onto the electrode, a coating solution prepared by dissolving 12 g of a polycarbonate resin in a mixed solvent of 80 ml of tetrahydrofuran and 20 ml of cyclohexanone was applied by using a spin coating method so that an insulating layer 16 having a thickness of 3 μm was formed; thus, a pair of substrates with electrodes formed thereon was obtained.

Black display particles (1 g) and carrier B (9 g) were mixed by a shaker (YS-LD, made by Yayoi Co., Ltd.) for 30 minutes so that display particles were charged. The resulting mixtures (21, 210) were put on a conductive stage 100, as shown in FIG. 6(a), and one of the substrates with electrodes was disposed with a gap of about 2 mm being set from the stage 100. Between the electrode 15 and the stage 100, a DC bias of +50V and an AC bias of 2.0 kV were applied with a frequency of 2.0 kHz for 10 seconds so that black display particles 21 were allowed to adhere onto the insulating layer 16.

White display particles (1 g) and carrier A (9 g) were mixed by a shaker (YS-LD, made by Yayoi Co., Ltd.) for 30 minutes so that the display particles were charged. The resulting mixtures (22, 220) were put on a conductive stage 100, as shown in FIG. 6(b), and the other substrate with electrodes was disposed with a gap of about 2 mm being maintained from the stage 100. Between the electrode 15 and the stage 100, a DC bias of −50V and an AC bias of 2.0 kV were applied with a frequency of 2.0 kHz for 10 seconds so that the white display particles 22 were allowed to adhere onto the insulating layer 16.

As shown in FIG. 6(c), the substrate with electrodes to which the black display particles were adhered and the substrate with electrodes to which the white display particles were adhered were superposed so as to have a gap of 50 μm by making adjustments by barrier ribs, and the peripheral portions of the substrates were bonded to each other with an epoxy-based adhesive so that an image display apparatus was prepared. Additionally, the volume-filling-ratio of the two display particles between glass substrates was 50%. The mixing rate of the white display particles and the black display particles was set to 1/1 in weight ratio.

Examples 2 to 7/Comparative Examples 1 to 2

An image display apparatus was manufactured by using the same method as that of example 1, except that, upon producing the white display particles and black display particles, predetermined compound A and compound B shown in Tables 1 and 2 were applied at a predetermined ratio.

TABLE 1

Black display particles

| | | Metal oxide layer | | |
|---|---|---|---|---|
| | Compound A/Compound B = Amount of use (g) = Ratio of use | Metal oxide fine particles (average primary particle size: nm) | Formation method/Thickness (nm) | Organic layer Negatively chargeable surface treating agent/Thickness (nm) |
| Example 1 | Tetraethoxysilane/ Dimethyldiethoxysilane = 8.5 g:8.5 g = 50:50 | Silica (30) | Wet type/30 | Hexamethyldisilazane/ 1 nm |
| Example 2 | Tetraethoxysilane/ Methyltriethoxysilane = 8.5 g:8.5 g = 50:50 | Silica (30) | Wet type/30 | Hexamethyldisilazane/ 1 nm |
| Example 3 | Tetraethoxysilane/ Methylphenyldiethoxysilane = 8.5 g:8.5 g = 50:50 | Silica (30) | Wet type/20 | Hexamethyldisilazane/ 1 nm |
| Example 4 | Tetraethoxysilane/Methyl-3-methacryloxypropyldiethoxysilane = 8.5 g:8.5 g = 50:50 | Silica (30) | Wet type/20 | Hexamethyldisilazane/ 1 nm |
| Example 5 | Tetraethoxysilane/ Dimethyldiethoxysilane = 3.4 g:13.6 g = 20:80 | Silica (20) | Wet type/20 | Hexamethyldisilazane/ 1 nm |
| Example 6 | Tetraethoxysilane/ Dimethyldiethoxysilane = 13.6 g:3.4 g = 80:20 | Silica (40) | Wet type/40 | Hexamethyldisilazane/ 1 nm |
| Example 7 | Tetraethoxytitanium/ Dimethyldiethoxytitanium = 9.6 g:9.6 g = 50:50 | Titania (50) | Wet type/50 | Hexamethyldisilazane/ 1 nm |
| Comparative Example 1 | Tetraethoxysilane only | Silica (50) | Wet type/50 | Hexamethyldisilazane/ 1 nm |
| Comparative Example 2 | Dimethyldiethoxysilane only | Silica (10) | Wet type/10 | Hexamethyldisilazane/ 1 nm |

TABLE 2

White display particles

| | | Metal oxide layer | | |
|---|---|---|---|---|
| | Compound A/Compound B = Amount of use (g) = Ratio of use | Metal oxide fine particles (average primary particle size: nm) | Formation method/Thickness (nm) | Organic layer Positively chargeable surface treating agent (First treating agent/Second treating agent)/ Thickness (nm) |
| Example 1 | Tetraethoxysilane/ Dimethyldiethoxysilane = 8.5 g:8.5 g = 50:50 | Silica (30) | Wet type/30 | N-(2-aminoethyl)-3-aminopropyltriethoxysilane/ Hexamethyldisilazane/1 nm |
| Example 2 | Tetraethoxysilane/ Methyltriethoxysilane = 8.5 g:8.5 g = 50:50 | Silica (30) | Wet type/30 | N-(2-aminoethyl)-3-aminopropyltriethoxysilane/ Hexamethyldisilazane/1 nm |
| Example 3 | Tetraethoxysilane/ Methylphenyldiethoxysilane = 8.5 g:8.5 g = 50:50 | Silica (20) | Wet type/20 | N-(2-aminoethyl)-3-aminopropyltriethoxysilane/ Hexamethyldisilazane/1 nm |
| Example 4 | Tetraethoxysilane/Methyl-3-methacryloxypropyldiethoxysilane = 8.5 g:8.5 g = 50:50 | Silica (20) | Wet type/20 | N-(2-aminoethyl)-3-aminopropyltriethoxysilane/ Hexamethyldisilazane/1 nm |
| Example 5 | Tetraethoxysilane/ Dimethyldiethoxysilane = 3.4 g:13.6 g = 20:80 | Silica (20) | Wet type/20 | N-(2-aminoethyl)-3-aminopropyltriethoxysilane/ Hexamethyldisilazane/1 nm |
| Example 6 | Tetraethoxysilane/ Dimethyldiethoxysilane = 13.6 g:3.4 g = 80:20 | Silica (40) | Wet type/40 | N-(2-aminoethyl)-3-aminopropyltriethoxysilane/ Hexamethyldisilazane/1 nm |
| Example 7 | Tetraethoxytitanium/ Dimethyldiethoxytitanium = 9.6 g:9.6 g = 50:50 | Titania (50) | Wet type/50 | N-(2-aminoethyl)-3-aminopropyltriethoxysilane/ Hexamethyldisilazane/1 nm |
| Comparative Example 1 | Tetraethoxysilane only | Silica (50) | Wet type/50 | N-(2-aminoethyl)-3-aminopropyltriethoxysilane/ Hexamethyldisilazane/1 nm |
| Comparative Example 2 | Dimethyldiethoxysilane only | Silica (10) | Wet type/10 | N-(2-aminoethyl)-3-aminopropyltriethoxysilane/ Hexamethyldisilazane/1 nm |

Evaluation

A DC voltage was applied to the image display apparatus in the following processes, and by measuring the reflection density of a display image obtained by the voltage application, the display characteristic was evaluated. Additionally, the voltage application was carried out by the following processes: that is, the voltage is applied in a manner so as to follow a hysteresis curve of a course in which, after the applied voltage has been changed from 0V to the plus side, it is successively changed to the minus side, and then returned to 0V.

(1) The voltage application is carried out with the voltage being changed with 20V intervals from 0V to +100V.
(2) The voltage application is carried out with the voltage being changed with 20V intervals from +100V to −100V.
(3) The voltage application is carried out with the voltage being changed with 20V intervals from −100V to 0V.

When a DC voltage was applied to each of the image display apparatuses in the above-mentioned processes, it was confirmed that, upon application of a plus voltage in a state of white display, the display was changed from white to black. Additionally, the voltage to be applied to the electrode on the upstream side in the visually recognizable direction of the image display apparatus was changed, with the other electrode being electrically earthed.

The contrast was evaluated based upon a difference between the black color density and the white color density, that is, based upon the density difference defined by the following equation:

Contrast=black color density−white color density

The black color density was a reflection density of the display surface obtained upon application of a voltage of +100 V to the electrode on the upstream side in the visually recognizable direction of the image display apparatus.

The white color density was a reflection density of the display surface obtained upon application of a voltage of −100 V to the electrode on the upstream side in the visually recognizable direction of the image display apparatus.

Densities at five points on the display surface were randomly measured by using a reflection densitometer "RD918 (made by Macbeth Process Measurements Co.)", and the density was given as the average value of these.

Contrast Durability

The repetitive characteristic was evaluated in the following manner: voltage applications of +100 V and −100 V were alternately repeated, and at the time when, upon measuring the reflection density each time, the contrast became 0.70 or less, the repetitive characteristic was evaluated based upon the number of repetition times at this time. The repetitive characteristic was evaluated based upon the following criteria: the repetition times of 50000 or more was rated as superior (◯); the repetition times of 30000 or more was rated as acceptable (Δ) and the repetition times of less than 30000 was rated as rejected (×).

TABLE 3

| | Contrast Durability |
|---|---|
| Example 1 | ◯ |
| Example 2 | ◯ |
| Example 3 | Δ |
| Example 4 | Δ |
| Example 5 | Δ |
| Example 6 | Δ |

TABLE 3-continued

| | Contrast Durability |
|---|---|
| Example 7 | ◯ |
| Comparative Example 1 | × |
| Comparative Example 2 | × |

EFFECTS OF THE INVENTION

In the display particles of the present invention, since the metal oxide layers comprise a polycondensation product formed by predetermined compounds and the flexibility of the metal oxide layers are thus improved, it is possible to prevent cracks and film separations from occurring in the metal oxide layers for a long period of time. As a result, it becomes possible to sufficiently prevent degradation of contrast during repetitive driving operations for a long period of time.

What is claimed is:

1. Display particles for an image display apparatus provided with two substrates at least one of which is transparent, with the display particles being sealed between the substrates in a powder state, so that by generating an electric field between the substrates, the display particles are moved to display an image,
wherein the display particles have metal oxide layers formed on the entire surfaces of base particles containing at least a resin and a colorant, and
the metal oxide layers comprise a polycondensation product formed by using a compound A represented by the following formula (A) and a compound B represented by the following formula (B) as materials:

$$M^1(OR^1)_4 \qquad (A)$$

wherein $M^1$ represents a silicon atom or a titanium atom; and $R^1$ represent an alkyl group having 1 to 4 carbon atoms respectively independently:

$$M^2(R^2)_{4-n}(OR^3)_n \qquad (B)$$

wherein $M^2$ represents a silicon atom or a titanium atom; $R^2$ represent an alkyl group having 1 to 4 carbon atoms, a phenyl group, an acryloyloxy group, a methacryloyloxy group or an epoxy group independently; $R^3$ represent an alkyl group having 1 to 4 carbon atoms independently; and n represents an integer of 2 or 3.

2. The display particles for an image display apparatus of claim 1, wherein organic layers are further formed on the surfaces of the metal oxide layers.

3. The display particles for an image display apparatus of claim 1, wherein the metal oxide layers comprise metal oxide fine particles having an average primary particle size in the range from 5 to 250 nm.

4. The display particles for an image display apparatus of claim 1, wherein the metal oxide layers are produced by a wet method.

5. An image display apparatus, comprising the display particles for an image display apparatus of claim 1.

6. The display particles for an image display apparatus of claim 1, wherein the compound A is one or more compounds selected from the group consisting of tetraethoxysilane, tetramethoxysilane, tetraisopropoxysilane, tetraethoxy titanium and tetramethoxy titanium.

7. The display particles for an image display apparatus of claim 1, wherein the compound B is one or more compounds selected from the group consisting of methyltriethoxysilane, methylphenyldiethoxysilane, methyl-3-methacryloxypropyldiethoxysilane, dimethyldiethoxysilane, methyltriethoxy titanium, and dimethyldimethoxy titanium.

8. The display particles for an image display apparatus of claim 1, wherein the compound A and the compound B are used in the combination of tetraethoxysilane and dimethyldiethoxysilane.

9. The display particles for an image display apparatus of claim 1, wherein the compound A and the compound B are used in the combination of tetraethoxysilane and methyltriethoxysilane.

10. The display particles for an image display apparatus of claim 1, wherein the metal oxide layer has a composition ratio (A/B) between the compound A and the compound B of 15/85 to 85/15 in weight ratio, in the case where the compound B is a metal dialkoxide of n=2.

11. The display particles for an image display apparatus of claim 1, wherein the metal oxide layer has a composition ratio (A/B) between the compound A and the compound B of 15/85 to 85/15 in weight ratio, in the case where the compound B is a metal trialkoxide of n=3.

12. The display particles for an image display apparatus of claim 1, wherein the display particles comprise positively chargeable display particles and negatively chargeable display particles in a mixing weight ratio of 1/3 to 3/1.

13. The display particles for an image display apparatus of claim 1, wherein the resin has a weight-average molecular weight of 5000 to 200000.

14. The display particles for an image display apparatus of claim 1, wherein the display particles comprise positively chargeable display particles and negatively chargeable display particles and the base particles of the positively chargeable display particles and the negatively chargeable display particles are used in combinations of white base particles and black base particles.

15. The display particles for an image display apparatus of claim 14, wherein the white base particles comprise titanium oxide as a white pigment.

16. The display particles for an image display apparatus of claim 14, wherein the black base particles comprise carbon black as a black pigment.

17. The display particles for an image display apparatus of claim 1, wherein the colorant is contained in a content of 1 to 200 parts by weight relative to 100 parts by weight of the resin.

18. An image display apparatus provided with two substrates at least one of which is transparent, with the display particles being sealed between the substrates in a powder state, so that by generating an electric field between the substrates, the display particles are moved to display an image,
wherein the display particles have metal oxide layers formed on the entire surfaces of base particles containing at least a resin and a colorant, and
the metal oxide layers comprise a polycondensation product formed by using a compound A represented by the following formula (A) and a compound B represented by the following formula (B) as materials:

$$M^1(OR^1)_4 \qquad (A)$$

wherein $M^1$ represents a silicon atom or a titanium atom; and $R^1$ represent an alkyl group having 1 to 4 carbon atoms respectively independently:

$$M^2(R^2)_{4-n}(OR^3)_n \qquad (B)$$

wherein $M^2$ represents a silicon atom or a titanium atom; $R^2$ represent an alkyl group having 1 to 4 carbon atoms, a phenyl group, an acryloyloxy group, a methacryloyloxy group or an epoxy group independently; $R^3$ represent an alkyl group having 1 to 4 carbon atoms independently; and n represents an integer of 2 or 3.

* * * * *